Patented Dec. 24, 1940

2,225,671

UNITED STATES PATENT OFFICE 2,225,671

MANUFACTURE OF SECONDARY ARYL SUBSTITUTED ALKYL KETONES

Gerrit John Van Zoeren, Holland, Mich.

No Drawing. Application July 13, 1938, Serial No. 218,969. Renewed February 23, 1940

5 Claims. (Cl. 260—592)

This invention relates to the manufacture of aromatic substituted ketones of the aliphatic series, and characterized in that the aromatic nucleus is joined to a secondary carbon atom, which carbon atom is joined to the carbonyl group of the ketone.

The invention has as its object an improved method for producing ketones of the aforementioned class, whereby good yields of easily refined products are obtainable more economically than has been possible heretofore by known methods.

The products which are obtainable by my method may be represented by the following formula:

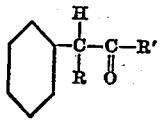

where R is an alkyl group, such as methyl, ethyl, propyl, butyl, isopropyl, and having preferably not more than six carbon atoms and R' is an alkyl group, such as methyl, ethyl, isopropyl, or butyl and likewise preferably having not more than six carbon atoms.

The aromatic nucleus may be substituted by one or more groups, such as a phenyl group; an alkyl group, notably methyl, ethyl, propyl and butyl; a hydroxy alkyl ether group, such as the methoxy, ethoxy, etc.; a halogen atom such as chlorine, etc. The aromatic nucleus may be mono- or poly-cyclic, although compounds of the benzene series are preferred.

The products of the type contemplated herein have been made heretofore by the Levy and Jullien method reported in Bull. Soc. Chimique IV, vol. 45, p. 941 (1929). It is to be noted that the foregoing ketones contain a carbon atom which inter-connects the aromatic nucleus with the carbonyl group, which carbon atom also has a hydrogen and an alkyl group joined thereto, and these ketones are therefore readily distinguishable from products wherein the hydrogen atom is substituted by a second alkyl group, such as are obtained by the method described in Annales de Chemie (11) vol. 1, p. 257-358 (1934).

I have found that halogenated aromatic hydrocarbons, preferably the brominated aromatic hydrocarbons, if first combined with magnesium, will react with halogenated ketones represented by the formula:

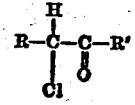

where R is an alkyl group having from one to five carbon atoms and R' is an alkyl group having from one to six carbon atoms, and that by heating the normal reaction product obtained from an aromatic halide Grignard reagent and the halogenated aliphatic ketone in which the halogen group is joined to a secondary carbon atom adjacent to the carbonyl group of the ketone, one obtains even at moderately elevated temperatures a re-arrangement whereby the aromatic group shifts to the secondary carbon atom adjacent to the CO group of the complex, while at the same time the halogen of the ketone is liberated probably in the form of magnesium chlorbromide. The conditions of the reaction are more fully set forth hereinafter.

The following example illustrates the application of the principles of my invention in the manufacture of 3-phenyl butanone-2, having the following formula:

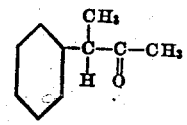

A liter three-necked flask is fitted with (1) a reflux condenser which should be connected with a calcium chloride-soda lime tube to maintain anhydrous reaction conditions within, (2) an agitator, (3) a dropping funnel, and (4) a thermometer. The flask is charged with 40 grams of magnesium turnings (Grignard grade), a crystal of iodine, and approximately 70 cc. of anhydrous, alcohol free, ethyl ether. Approximately 5 grams of mono-bromo-benzene is now added and the mixture is agitated and refluxed until the reaction commences, after which 265 grams of bromo-benzene diluted with about an equal volume of dry ether is added through the dropping funnel at such a rate as to maintain the reaction mixture at a vigorous boil. The rate of addition may be increased by external cooling of the flask. The time required for the addition may extend from one and one-half to two hours.

Thereafter the contents of the flask are refluxed with the aid of external heating for an additional half hour.

To the foregoing reacted mixture I add, after cooling the contents to 0° C., 193 grams of chlor ethyl methyl ketone having the following formula:

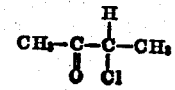

and diluted with about an equal volume of dry ethyl ether. The rate of addition is adjusted whereby the temperature of the contents of the flask may be maintained, not substantially above, approximately 5° C. By using a salt-ice cooling mixture I have experienced no difficulty in adding all of the material within one and a half to two hours while maintaining the aforementioned temperature conditions.

After all of the chlorinated ketone has been added, the temperature of the reaction mixture is allowed to rise slowly to approximately 20° C. where it is maintained for a half hour, after which the flask is heated on a water bath to maintain a gentle reflux, preferably with agitation, for approximately five hours. This treatment induces the re-arrangement of the normal Grignard condensation product to the desired ketone. The contents of the flask are then cooled and the mixture treated with about 100 g. of chopped ice. Subsequently, a cold dilute mineral acid such as sulfuric, is added in sufficient amounts to render the mixture acid to Congo red and the mixture is agitated until a complete solution of the solids is attained. The liquid is then allowed to settle. The lower aqueous layer is separated, as by means of a separatory funnel, and the small amount of product dissolved therein may then be recovered conveniently by extracting the aqueous solution with a small amount of ether or benzene. The extract may be added to the main portion which is then first washed with water, then with a dilute bicarbonate solution to remove the free acid, and finally once or twice with water. The solution is then distilled, preferably after drying by contact with a desiccating agent such as anhydrous sodium sulfate. Upon distillation, the ether (and benzene) is recovered first, after which the ketone distills at 114–116° C., at 33 mm., the amount thereof being approximately 170 grams. The ketone recovered will be found to have a boiling range of 212–214° C. at atmospheric pressure.

A modification of the foregoing process, in the re-arrangement of the Grignard chloro methyl ethyl ketone complex, consists in distilling off the ether slowly until finally the residue becomes a thick mass. This latter is then treated with ice and dilute acid until it is completely liquefied. Upon addition of a solvent such as benzene, the ketone layer is separated, washed, and the desired ketone isolated as above described.

In general, I prefer to follow the first procedure inasmuch as I have found it to be more convenient and equally satisfactory from the yield point of view.

The reaction between the magnesium metal and the bromo-benzene is, in general, conducted according to the well-known methods for the Grignard reaction. In general, a reflux temperature is satisfactory since the rate of reaction at this temperature is rapid. It is to be understood that the temperature conditions are not critical and that certain solvents, other than dry ethyl ether, for this reaction may be used. For this purpose diethyl ether is preferred, but if one desires other solvents, these may be used, as is well understood by those skilled in Grignard syntheses.

The source of the secondary chlor aliphatic ketone (beta-chloro-methyl-ethyl ketone in the example above) is not material nor part of the present invention. In general, these materials can be obtained by direct chlorination and separation by fractional distillation of the isomeric monochlorinated ketones.

The reaction between the Grignard reagent and the chlorinated ketone is rapid even at 0° C. While I prefer that the temperature be maintained not substantially higher than 5° C., it is to be understood that somewhat higher temperatures than 5° C., or lower temperatures than 0° C. may be used. The yields are not as satisfactory at higher temperatures and temperatures lower than 0° C. are not necessary to satisfactory operations. The amount of ether used in the reaction should in general be sufficient to maintain without difficulty homogeneous fluid reaction conditions, such as to make possible good agitating conditions. The rate of addition of the halogenated ketone is determined to a large extent by the cooling facilities available.

The re-arrangement of the normal Grignard reaction product, wherein the chlorine from the aliphatic compound is split off, takes place at a fairly rapid rate at reflux temperatures of the ether mixture. The exact temperature conditions are not critical except that at substantially lower temperatures the rate of re-arrangement is extremely slow.

By substituting for the chloro-methyl-ethyl ketone in the example described hereinabove, beta-chloro-methyl-propyl ketone

beta-chloro-diethyl ketone

etc., and otherwise proceeding substantially as described therein, one obtains the corresponding homologues.

What I claim is:

1. The method of making aromatic substituted aliphatic ketones, wherein the aromatic group is joined to a carbon atom adjacent to the carbonyl group and having the probable formula:

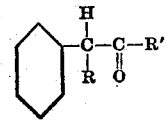

where R is an alkyl group having one to five carbon atoms and R' is an alkyl group having one to six carbon atoms, which method comprises reacting an aromatic halide with magnesium to form the corresponding Grignard reagent and subsequently reacting the Grignard reagent with an aliphatic halogenated ketone having the formula:

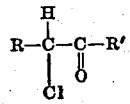

where R is an alkyl group having one to five carbon atoms and R' is an alkyl group having one to six carbon atoms, and wherein the halogen is joined to the secondary carbon atom adjacent to the carbonyl group and subsequently rearranging the resulting reaction product before hydrolysis.

2. The method as described in claim 1 and characterized in that the rearrangement is effected by heating the halogen ketone-Grignard reagent complex to reaction temperature.

3. The method as defined in claim 1 and further characterized in that the aromatic halide is an aromatic bromide.

4. The method as defined in claim 1 and further characterized in that the aromatic halide is substituted in the nucleus by a member of the group consisting of one or more alkyl groups having not more than six carbon atoms in the alkyl chain, a hydroxy group, methoxy group, and alkoxy group.

5. The method of making 3-phenyl butanone-2 which comprises reacting a bromo-phenyl magnesium Grignard reagent with chlor ethyl methyl ketone having the formula $CH_3COCHClCH_3$, under Grignard reaction conditions and subsequently increasing the temperature sufficiently to form the 3-phenyl butanone-2.

G. JOHN VAN ZOEREN.